United States Patent [19]

Dreschmann et al.

[11] Patent Number: 5,005,992
[45] Date of Patent: Apr. 9, 1991

[54] SEAL FOR SELF-ALIGNING BEARINGS

[75] Inventors: Peter Dreschmann, Dittelbrunn; Wilhelm Walter, Oberthulba/Reith, both of Fed. Rep. of Germany

[73] Assignee: FAG Kugelfischer George Schafer (KGaA), Fed. Rep. of Germany

[21] Appl. No.: 505,055

[22] Filed: Apr. 5, 1990

[30] Foreign Application Priority Data

Apr. 11, 1989 [DE] Fed. Rep. of Germany ... 8904504[U]

[51] Int. Cl.$^5$ .................. F16C 33/72; F16C 23/08
[52] U.S. Cl. .................... 384/484; 384/482; 384/558
[58] Field of Search ........... 384/477, 482, 484-486, 384/495, 558; 277/182

[56] References Cited

U.S. PATENT DOCUMENTS

| | | | |
|---|---|---|---|
| 2,584,227 | 2/1952 | Potter | 384/482 |
| 2,619,369 | 11/1952 | Williams | 277/182 |
| 3,187,591 | 6/1965 | Johnson | 384/558 X |
| 3,951,783 | 4/1976 | Cochran | 384/482 |
| 4,755,067 | 7/1988 | Asberg et al. | 384/558 X |
| 4,790,543 | 12/1988 | Wittmeyer et al. | 384/482 X |

*Primary Examiner*—Thomas R. Hannon
*Attorney, Agent, or Firm*—Ostrolenk, Faber, Gerb & Soffen

[57] ABSTRACT

A seal structure is disclosed in which self-aligning bearings have flanges fastened to respective ends of the inner and outer rings. The flanges overlap with an annular gap between them. A sealing ring having two sealing lips is fixed to one of the flanges. The other flange has an axially extending portion which is concentric with the axis of the bearing and has a spherical outer surface. In one embodiment, one sealing lip extends across the gap and presses against the spherically curved surface. This sealing lip remains sealed to the outer surface even when the bearing rings swing out of alignment with one another. The second sealing lip rests against an approximately radial portion of one of the flanges to improve the sealing action. A second embodiment contains an additional third sealing lip, which is obliquely inclined toward the spherically curved portion of the flange. A third embodiment contains a further leg attached to the spherically curved portion of the flange which extends close to the other surface flange, creating a labyrinth pre-seal which is better able to retain the lubricant in the bearing space.

7 Claims, 2 Drawing Sheets

SEAL FOR SELF-ALIGNING BEARINGS

BACKGROUND OF THE INVENTION

This invention relates to a seal for self-aligning bearings and more specifically relates to a novel seal for such bearings.

A prior art seal is disclosed in Federal Republic of Germany published application OS 37 09344 includes a sheet metal ring fastened both on the outer ring and on the respective inner ring of the bearing. One of the sheet metal rings has on it at least one sealing ring, and the sealing ring has a lip which comes to rest on the other facing sheet metal ring and therefore seals off the space within which the bearing rollers are contained. One disadvantage of this embodiment is that, particularly in the case of a large angular swing of the rings of the self-aligning bearing, the sheet metal rings shift so that gaps can occur between the sealing lips and the sheet metal rings. Only a small range of swing can readily be accommodated without experiencing problems with the resilient sealing lips.

SUMMARY OF THE INVENTION

The object of the present invention is to provide a seal for self aligning bearings which does not have the disadvantages indicated above and whose sealing lip rests against the surface of the opposite sheet metal ring, even in the case of large relative swinging movements of the bearing rings relative to one another.

In accordance with the invention, a first one of the sheet metal rings or flanges on one ring, and particularly the outer ring, has a generally axially extending portion which is approximately spherically curved around the center of the bearing and which extends approximately parallel to and concentric with the axis of the bearing. The other second sealing ring or flange on the other bearing ring, and particularly the inner ring, has a resilient body including at least one resilient sealing lip formed on it. The sealing lip is shaped and directed to rest on the convex surface of the spherical portion of the first sealing ring at the center of that portion when the bearing rings are centered about their full range of swinging movement. This arrangement then uniformly applies the resilient sealing lip against that spherical portion of the first flange at all positions reached during swinging movement of the bearing rings, without loss in sealing action within the limits of the length of the spherically curved portion.

Since a single sealing lip is frequently not sufficient to produce adequate sealing, in a further embodiment of the invention, a second sealing lip is fastened to the second sheet metal ring. That second lip is inclined obliquely and rests against an approximately radially extending portion of the first sheet metal ring or flange. The sealing action of this lip changes as the bearing rings swing out relatively, but as a second seal is involved here, this action is not detrimental. If, in such an embodiment, the sealing lip is arranged on the second sheet metal ring which is attached to the inner ring of the bearing, and if the inner ring rotates, a slinging of lubricant radially toward the outside takes place in the region of this second sealing lip so that the dirt cannot reach the inner sealing lip.

In order to improve the retention of lubricant within the bearing space, a third sealing lip may be provided on the second sheet metal ring. That third lip is also obliquely inclined and extends up into the region of and is radially inward of the spherically curved portion of the first sheet metal ring.

In still another embodiment, the first sheet metal ring, which does not have a sealing lip, may extend radially with a further arm up to approximately the travel surface of the other second sheet metal ring. This produces a labyrinthine preseal.

Other objects and features of the invention are explained with reference to the drawings.

DESCRIPTION OF THE PREFERRED EMBODIMENTS

Figure 1:
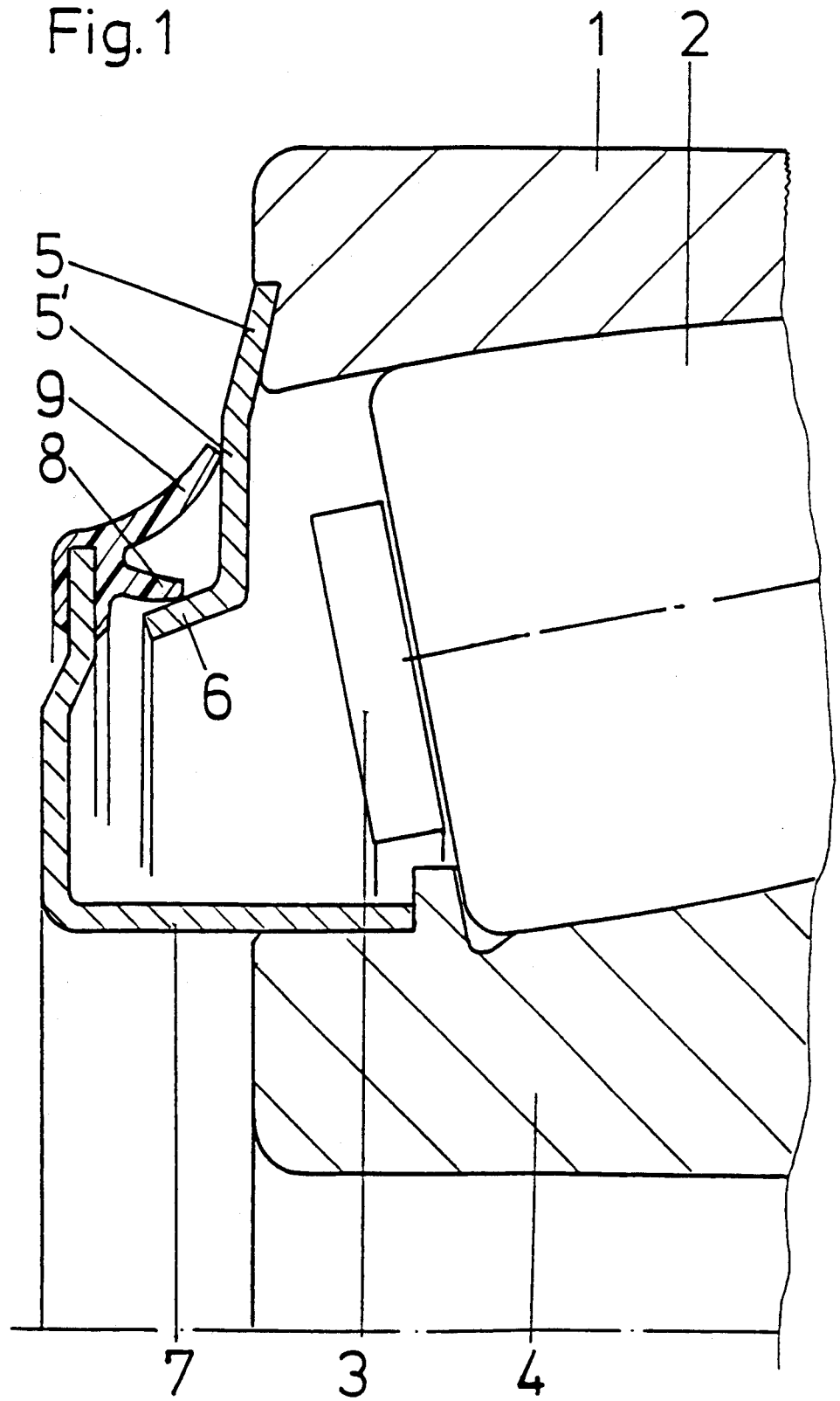
FIG. 1 is a partial cross-section through a fragment of a self-aligning roller bearing made in accordance with a first embodiment of the new seal.

FIG. 1 shows a first embodiment of the self aligning roller bearing of the invention. It shows a respective portion of the outer ring 1 of the bearing, one of the rollers 2 a separator or cage 3 for the rollers, and a portion of the inner ring 4 of the bearing. The invention applies to self aligning bearings using any type of roller or ball bearing rolling element between the rings.

A first sheet metal ring or flange 5, which is fastened on the outer ring 1, has a radially inwardly located, generally spherically curved flange 6, which comprises that part of a sphere that extends approximately parallel to the axis bearing. The radius of curvature of the upper surface of flange 6 is the radius of the relative swing of the outer ring 1 relative to the inner ring 4 during normal operations and misalignments of the rings of the self aligning bearing and therefore extends from the center of the bearing Another second sheet metal ring or flange 7 is fastened on the inner ring 4. It includes a radially outwardly extending flange portion. A resilient sealing ring is fastened to the flange portion of the ring 7 and that resilient sealing ring has two resilient sealing lips 8 and 9. The first sealing lip 8 is directed to press against the center of the outer or convex side of the spherically curved portion 6 of the first sheet metal ring 5 when the bearing outer ring 1 and the bearing inner ring 4 are centered on one another and are not misaligned. Therefore, even upon large swinging movements of the bearing rings 1 and 4, of up to 5 degrees, no reduction in the sealing action will occur between resilient lip 8 and flange 6. These same sealing conditions are not present in the case of the second sealing lip 9 because the lip 9 faces an approximately radially directed portion 5' of the sheet metal ring 5. Since the lip 9 is merely a preseal, which furthermore acts as a sling lip for containing slung off lubricant when the inner ring 4 is rotating, these sealing conditions are sufficient.

Figure 2:
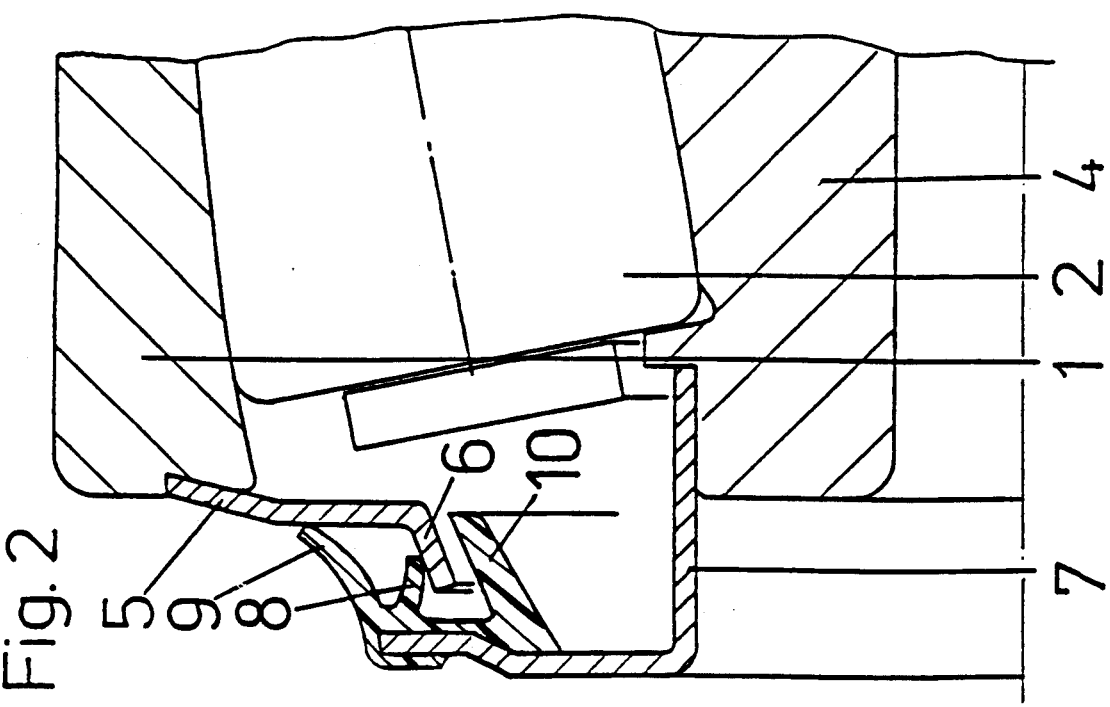
FIG. 2 is a similar cross section through a second embodiment of the invention.

In order further to increase the sealing action, the seal embodiment shown in FIG. 2 is provided with a third sealing lip 10 on the second ring. The third lip is directed obliquely toward and is radially beneath and spaced from the concave side of the spherically curved flange portion 6. This better retains the lubricant within the inner space of the bearing.

Figure 3:
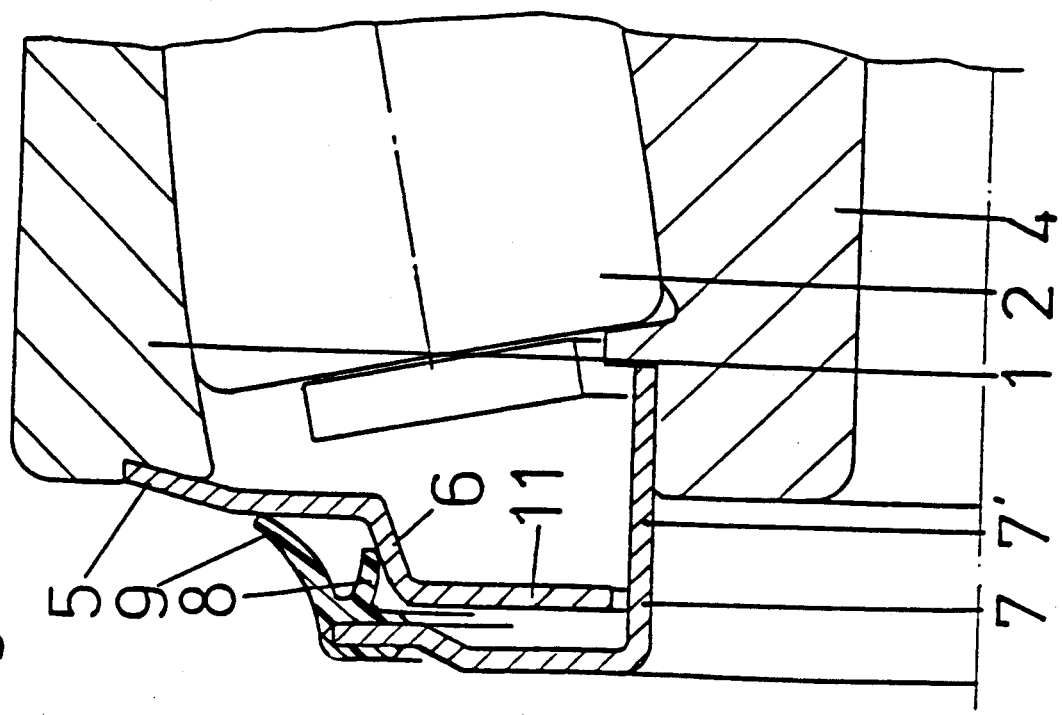
FIG. 3 is a similar cross section through a third embodiment of the invention.

A similar effect is also obtained if, as shown in FIG. 3, the first sheet metal ring 5 has a radial extension in the form of a radial leg 11 which extends close to the attachment portion 7' of the other sheet metal ring 7, with sufficient spacing to accommodate the misalignments of the bearing rings 1 and 4.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A seal for self-aligning bearing wherein said bearing has an inner and an outer concentric bearing ring, said bearing rings each having opposite first and second axial ends, and said bearing rings are rotatable relative to one another and are supported relative to one another by interposed bearing roller means between said rings;
   a first seal ring fastened to said first axial end of said inner bearing ring said first seal ring also having a radially extending portion;
   a second seal ring fastened to said first axial end of said outer bearing ring that is adjacent said first axial end of said inner bearing ring, said first and second seal rings partially overlapping radially and having an annular gap between them;
   a first resilient sealing lip fixed to said first seal ring and extending across said annular gap and resiliently pressing against said second seal ring; a second resilient sealing lip fastened to said second seal ring and shaped and oriented to rest with oblique inclination against said radially extending portion of said first seal ring;
   said second seal ring having a mostly axially outwardly extending portion which is approximately spherically radially and axially outwardly convexly curved around the center of said bearing and said first sealing lip pressing against said convexly spherically curved portion, whereby said first lip continuously sealingly presses against said outwardly extending spherically and convexly curved portion when said bearing rings misalign.

2. A seal according to claim 1 wherein said mostly axially outwardly extending portion of said second seal ring is so shaped and oriented and said first resilient sealing lip is so shaped and directed that said first resilient sealing lip presses against the approximate center of said spherically and convexly curved portion of said second seal ring when said inner and outer rings are centered on one another.

3. A seal according to claim 2, further comprising a third sealing lip fastened to said first ring and being radially inward of and being directed obliquely toward said approximately spherically and convexly curved outwardly extending portion of said second seal ring to define an extra seal against leakage.

4. A seal according to claim 2, further comprising a radially inwardly extending leg on said second seal ring which terminates at a location radially closely spaced from said first seal ring.

5. A seal according to claim 1, further comprising a third sealing lip fastened to said first ring and being radially inward of and being directed obliquely toward said approximately spherically and convexly curved outwardly extending portion of said second seal ring to define an extra seal against leakage.

6. A seal according to claim 1, further comprising a radially inwardly extending leg on said second seal ring which terminates at a location radially closely spaced from said first seal ring.

7. A seal according to claim 1 wherein said radially extending portion of said first seal ring extends radially outward and said second lip is radially outward of said first lip.

* * * * *